United States Patent
Wu et al.

(10) Patent No.: US 11,187,714 B2
(45) Date of Patent: Nov. 30, 2021

(54) PROCESSING DOWNHOLE ROTATIONAL DATA

(71) Applicant: Schlumberger Technology Corporation, Sugar Land, TX (US)

(72) Inventors: Jian Wu, Houston, TX (US); Nathaniel Wicks, Somerville, MA (US); Ramakrishna Madhireddy, Cypress, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 218 days.

(21) Appl. No.: 16/505,983

(22) Filed: Jul. 9, 2019

(65) Prior Publication Data

US 2021/0011048 A1 Jan. 14, 2021

(51) Int. Cl.
| | | |
|---|---|---|
| *G01P 3/44* | (2006.01) | |
| *G05B 13/02* | (2006.01) | |
| *E21B 44/02* | (2006.01) | |
| *E21B 45/00* | (2006.01) | |

(52) U.S. Cl.
CPC ............. *G01P 3/44* (2013.01); *E21B 44/02* (2013.01); *E21B 45/00* (2013.01); *G05B 13/024* (2013.01)

(58) Field of Classification Search
CPC ......... G01P 3/44; G05B 13/024; E21B 44/02; E21B 45/00
See application file for complete search history.

(56) References Cited

U.S. PATENT DOCUMENTS

| | | | |
|---|---|---|---|
| 6,166,654 A | 12/2000 | Van Den Steen | |
| 6,327,539 B1 | 12/2001 | Keultjes et al. | |
| 8,689,906 B2 | 4/2014 | Nessjoen et al. | |
| 8,950,512 B2 | 2/2015 | Nessjoen et al. | |
| 9,181,792 B2 | 11/2015 | Pena | |
| 9,424,667 B2 | 8/2016 | Pena et al. | |
| 9,581,008 B2 | 2/2017 | Kyllingstad | |
| 9,598,904 B2 | 3/2017 | Aldred et al. | |
| 9,885,231 B2 | 2/2018 | Nessjoen et al. | |
| 9,920,612 B2 | 3/2018 | Dwars et al. | |
| 9,932,811 B2 | 4/2018 | Dwars et al. | |
| 9,952,119 B2 | 4/2018 | Simanjuntak et al. | |
| 10,053,971 B2 | 8/2018 | Lai et al. | |

(Continued)

FOREIGN PATENT DOCUMENTS

WO 2019050824 A1 3/2019

OTHER PUBLICATIONS

A. Kyllingstad and P. J. Nessjoen, A New Stick-Slip Prevention System, SPE/IADC 119660, Mar. 2009, 14 pages.

(Continued)

*Primary Examiner* — Manuel A Rivera Vargas
(74) *Attorney, Agent, or Firm* — Jeffrey D. Frantz (57) ABSTRACT

Systems and methods for processing downhole rotational data. An example method includes commencing operation of a processing device to continually calculate a downhole oscillation index by receiving downhole rotational speed data indicative of downhole rotational speed of at least a portion of a drill string during drilling operations, calculating a fundamental oscillation time period of the drill string, calculating a time length of a time window based on the fundamental oscillation time period, and processing the downhole rotational speed data encompassed within the time window.

20 Claims, 6 Drawing Sheets

(56) References Cited

U.S. PATENT DOCUMENTS

| | | | |
|---|---|---|---|
| 10,233,740 B2 | 3/2019 | Patterson et al. | |
| 2014/0318234 A1* | 10/2014 | Zenith | E21B 49/008 |
| | | | 73/152.31 |
| 2016/0047219 A1 | 2/2016 | Jeffryes | |
| 2016/0076354 A1 | 3/2016 | Lai et al. | |
| 2017/0101861 A1 | 4/2017 | Kyllingstad | |
| 2018/0128093 A1 | 5/2018 | Jeffryes et al. | |
| 2018/0149010 A1 | 5/2018 | Zheng et al. | |
| 2018/0238162 A1 | 8/2018 | Jeffryes | |
| 2018/0274352 A1 | 9/2018 | Orban | |
| 2018/0320501 A1 | 11/2018 | Jeffryes et al. | |
| 2019/0106976 A1 | 4/2019 | Badgwell et al. | |
| 2019/0106979 A1 | 4/2019 | Hadi et al. | |
| 2019/0120040 A1 | 4/2019 | Zhao et al. | |
| 2019/0187012 A1* | 6/2019 | Wu | E21B 44/04 |

OTHER PUBLICATIONS

A. Kyllingstad and G.W. Halsey, A Study of Slip/Stick Motion of the Bit, SPE Drilling Engineering, Dec. 1988, pp. 369-373.

* cited by examiner

PROCESSING DOWNHOLE ROTATIONAL DATA

BACKGROUND OF THE DISCLOSURE

Wells are generally drilled into the ground or ocean bed to recover natural deposits of oil, gas, and other materials that are trapped in subterranean formations. Drilling operations may be performed by drilling systems having various surface and subterranean equipment operating in a coordinated manner. For example, a drive mechanism ("driver"), such as a top drive or rotary table located at a wellsite surface, can be used to rotate and advance a drill string into a subterranean formation to drill a wellbore. A drill string may include a plurality of drill pipes coupled together and terminating with a drill bit. Length of the drill string may be increased by adding additional drill pipes while depth of the wellbore increases. Wellbores can reach lengths of several kilometers vertically and/or horizontally.

During drilling operations, a drill string undergoes complicated dynamic behavior, including experiencing axial, lateral, and rotational vibrations, as well as frictional interactions with bottom and sidewalls of the wellbore being drilled. Rotational speed (i.e., angular velocity) measurements of the drill string taken at the wellsite surface (e.g., at the driver) and downhole (e.g., at the drill bit) have revealed that while top of the drill string rotates with a substantially constant rotational speed, lower portions of the drill string often rotate with varying rotational speeds. For example, a drill string may experience stick-slip motion, whereby a drill bit stops rotating (sticks) in a wellbore, such as due to friction, while top of the drill string continues to be rotated by a driver, twisting the drill string. When the drill bit becomes free and rotates again (slips), it accelerates to a rotational speed that may be higher than the rotational speed of the top of the drill string.

Such stick-slip motion may cause rotational (i.e., torsional) waves (e.g., oscillations, vibrations) that propagate or otherwise travel in an upward (i.e., uphole) and/or downward (i.e., downhole) directions along a drill string while the drill string is rotated within a wellbore. Stick-slip motion and the resulting rotational waves in the drill string are a recognized problem in the drilling industry and may result in a reduced rate of penetration through the subterranean formation, bit wear, torsional damage to the drill string, failures or damage to the surface driver, and/or other damage to the drilling system.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a rotation sensor, a visual output device, and a processing device comprising a processor and a memory storing computer program code. The rotation sensor facilitates downhole rotational speed data indicative of downhole rotational speed of at least a portion of a drill string during drilling operations. The processing device continually determines a downhole oscillation index by receiving the downhole rotational speed data, determining a fundamental oscillation time period of the drill string, determining a time length of a time window based on the fundamental oscillation time period, and processing the downhole rotational speed data encompassed within the time window. The processing device also continually outputs the downhole oscillation index for display on the visual output device to be viewed by a drill rig operator. The drill rig operator may change parameters of the drilling operations based on the downhole oscillation index displayed on the visual output device.

The present disclosure also introduces a method that includes commencing operation of a processing device to continually determine a downhole oscillation index by receiving downhole rotational speed data indicative of downhole rotational speed of at least a portion of a drill string during drilling operations, determining a fundamental oscillation time period of the drill string, determining a time length of a time window based on the fundamental oscillation time period, and processing the downhole rotational speed data encompassed within the time window.

The present disclosure also introduces a method that includes commencing operation of a processing device to continually determine a downhole oscillation index by receiving downhole rotational speed data indicative of downhole rotational speed of at least a portion of a drill string during drilling operations, determining a highest rotational speed variation among the downhole rotational speed data encompassed within a time window, and determining a quotient of the highest rotational speed variation and a predetermined reference rotational speed.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

Figure 1:
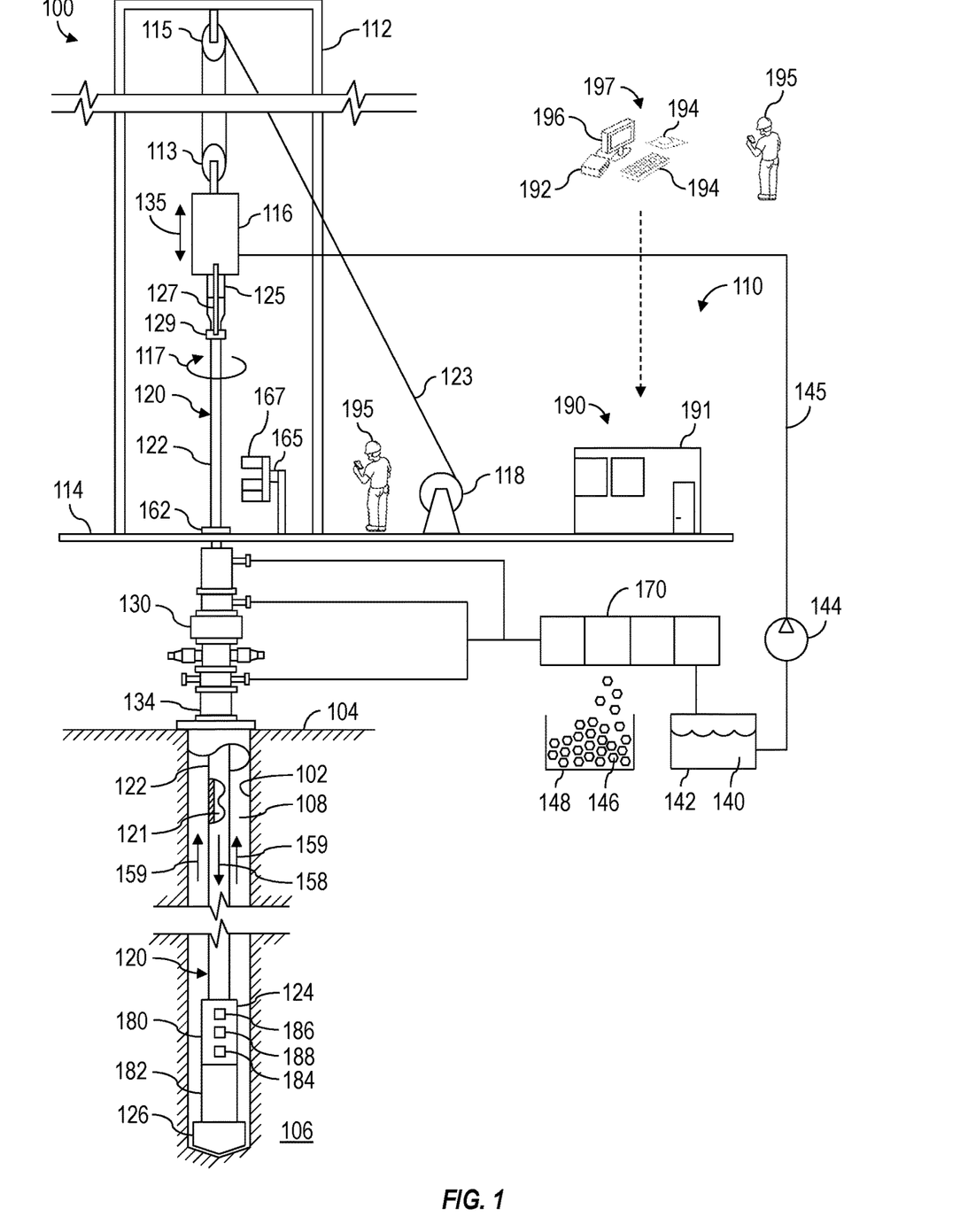
FIG. 1 is a schematic view of at least a portion of an example implementation of apparatus according to one or more aspects of the present disclosure.

FIG. 1 is a schematic view of at least a portion of an example implementation of a well construction system 100 according to one or more aspects of the present disclosure. The well construction system 100 represents an example environment in which one or more aspects of the present disclosure described below may be implemented. The well construction system 100 may be or comprise a drilling rig and associated wellsite equipment. Although the well construction system 100 is depicted as an onshore implementation, the aspects described below are also applicable to offshore implementations.

The well construction system 100 is depicted in relation to a wellbore 102 formed by rotary and/or directional drilling from a wellsite surface 104 and extending into a subterranean formation 106. The well construction system 100 includes surface equipment 110 located at the wellsite surface 104 and a drill string 120 suspended within the wellbore 102. The surface equipment 110 may include a mast, a derrick, and/or another support structure 112 disposed over a rig floor 114. The drill string 120 may be suspended within the wellbore 102 from the support structure 112. The support structure 112 and the rig floor 114 are collectively supported over the wellbore 102 by legs and/or other support structures (not shown).

The drill string 120 may comprise a bottom-hole assembly (BHA) 124 and means 122 for conveying the BHA 124 within the wellbore 102. The conveyance means 122 may comprise drill pipe, heavy-weight drill pipe (HWDP), wired drill pipe (WDP), tough logging condition (TLC) pipe, and/or other means for conveying the BHA 124 within the wellbore 102. A downhole end of the BHA 124 may include or be coupled to a drill bit 126. Rotation of the drill bit 126 and the weight of the drill string 120 collectively operate to form the wellbore 102. The drill bit 126 may be rotated by a driver at the wellsite surface 104 and/or via a downhole mud motor 182 connected with the drill bit 126. The BHA 124 may also include one or more downhole tools 180 above and/or below the mud motor 182.

The downhole tools 180 may be or comprise a measurement-while-drilling (MWD) or logging-while-drilling (LWD) tool comprising downhole sensors 184 operable for the acquisition of measurement data pertaining to the BHA 124, the wellbore 102, and/or the formation 106. The downhole sensors 184 may comprise an inclination sensor, a rotational position sensor, and/or a rotational speed sensor, which may include one or more accelerometers, magnetometers, gyroscopic sensors (e.g., micro-electro-mechanical system (MEMS) gyros), and/or other sensors for determining the orientation, position, and/or speed of one or more portions of the BHA 124 (e.g., the drill bit 126, the downhole tool 180, the mud motor 182) and/or other portions of the tool string 120 relative to the wellbore 102 and/or the wellsite surface 104. The downhole sensors 184 may comprise a depth correlation tool utilized to determine and/or log position (i.e., depth) of one or more portions of the BHA 124 and/or other portions of the tool string 120 within the wellbore 102 and/or with respect to the wellsite surface 104.

One or more of the downhole tools 180 and/or another portion of the BHA 124 may also comprise a telemetry device 186 operable to communicate with the surface equipment 110, such as via mud-pulse telemetry. One or more of the downhole tools 180 and/or another portion of the BHA 124 may also comprise a downhole processing device 188 operable to receive, process, and/or store information received from the surface equipment 110, the downhole sensors 184, and/or other portions of the BHA 124. The processing device 188 may also store executable computer programs (e.g., program code instructions), including for implementing one or more aspects of the operations described herein.

The support structure 112 may support the driver, such as a top drive 116, operable to connect (perhaps indirectly) with an upper end of the drill string 120, and to impart rotary motion 117 and vertical motion 135 to the drill string 120, including the drill bit 126. However, another driver, such as a kelly and a rotary table (neither own), may be utilized in addition to or instead of the top drive 116 to impart the rotary motion 117 to the drill string 120. The top drive 116 and the connected drill string 120 may be suspended from the support structure 112 via a hoisting system or equipment, which may include a traveling block 113, a crown block 115, and a draw works 118 storing a support cable or line 123. The crown block 115 may be connected to or otherwise supported by the support structure 112, and the traveling block 113 may be coupled with the top drive 116. The draw works 118 may be mounted on or otherwise supported by the rig floor 114. The crown block 115 and traveling block 113 comprise pulleys or sheaves around which the support line 123 is reeved to operatively connect the crown block 115, the traveling block 113, and the draw works 118 (and perhaps an anchor). The draw works 118 may, thus, selectively impart tension to the support line 123 to lift and lower the top drive 116, resulting in the vertical motion 135. The draw works 118 may comprise a drum, a base, and a prime mover (e.g., an engine or motor) (not shown) operable to drive the drum to rotate and reel in the support line 123, causing the traveling block 113 and the top drive 116 to move upward. The draw works 118 may be operable to reel out the support line 123 via a controlled rotation of the drum, causing the traveling block 113 and the top drive 116 to move downward.

The top drive 116 may comprise a grabber, a swivel (neither shown), elevator links 127 terminating with an elevator 129, and a drive shaft 125 operatively connected with a prime mover (e.g., an electric motor 202 shown in FIG. 2), such as via a gear box or transmission (not shown). The drive shaft 125 may be selectively coupled with the upper end of the drill string 120 and the prime mover may be selectively operated to rotate the drive shaft 125 and the drill string 120 coupled with the drive shaft 125. Hence, during drilling operations, the top drive 116, in conjunction with operation of the draw works 118, may advance the drill string 120 into the formation 106 to form the wellbore 102. The elevator links 127 and the elevator 129 of the top drive 116 may handle tubulars (e.g., drill pipes, drill collars, casing joints, etc.) that are not mechanically coupled to the drive shaft 125. For example, when the drill string 120 is being tripped into or out of the wellbore 102, the elevator 129 may grasp the tubulars of the drill string 120 such that the tubulars may be raised and/or lowered via the hoisting equipment mechanically coupled to the top drive 116. The top drive 116 may have a guide system (not shown), such as rollers that track up and down a guide rail on the support structure 112. The guide system may aid in keeping the top drive 116 aligned with the wellbore 102, and in preventing the top drive 116 from rotating during drilling by transferring reactive torque to the support structure 112.

The well construction system 100 may further include a drilling fluid circulation system or equipment operable to circulate fluids between the surface equipment 110 and the drill bit 126 during drilling and other operations. For example, the drilling fluid circulation system may be operable to inject a drilling fluid from the wellsite surface 104 into the wellbore 102 via an internal fluid passage 121 extending longitudinally through the drill string 120. The drilling fluid circulation system may comprise a pit, a tank, and/or other fluid container 142 holding the drilling fluid (i.e., mud) 140, and one or more pumps 144 operable to move the drilling fluid 140 from the container 142 into the fluid passage 121 of the drill string 120 via a fluid conduit 145 extending from the pump 144 to the top drive 116 and an internal passage extending through the top drive 116.

During drilling operations, the drilling fluid may continue to flow downhole through the internal passage 121 of the drill string 120, as indicated by directional arrow 158. The drilling fluid may exit the BHA 124 via ports in the drill bit 126 and then circulate uphole through an annular space 108 ("annulus") of the wellbore 102 defined between an exterior of the drill string 120 and the sidewall of the wellbore 102, such flow being indicated by directional arrows 159. In this manner, the drilling fluid lubricates the drill bit 126 and carries formation cuttings uphole to the wellsite surface 104. The drilling fluid flowing downhole through the internal passage 121 may selectively actuate the mud motor 182 to rotate the drill bit 126 instead of or in addition to the rotation of the drill string 120. Accordingly, rotation of the drill bit 126 caused by the top drive 116 and/or mud motor 182 may advance the drill string 120 through the formation 106 to form the wellbore 102.

The well construction system 100 may further include fluid control equipment 130 for maintaining well pressure control and for controlling fluid being discharged from the wellbore 102. The fluid control equipment 130 may be mounted on top of a wellhead 134. The drilling fluid flowing upwardly 159 toward the surface 104 may exit the annulus 108 via one or more valves of the fluid control equipment 130, such as a bell nipple, an RCD, and/or a ported adapter (e.g., a spool, cross adapter, a wing valve, etc.) located below one or more portions of a BOP stack. The drilling fluid may then pass through drilling fluid reconditioning equipment 170 to be cleaned and reconditioned before returning to the fluid container 142. The drilling fluid reconditioning equipment 170 may separate drill cuttings 146 from the drilling fluid into a cuttings container 148.

An iron roughneck 165 may be positioned on the rig floor 114. The iron roughneck 165 may comprise a torqueing portion 167, such as may include a spinner and a torque wrench comprising a lower tong and an upper tong. The torqueing portion 167 of the iron roughneck 165 may be moveable toward and at least partially around the drill string 120, such as may permit the iron roughneck 165 to make up and break out connections of the drill string 120. The torqueing portion 167 may also be moveable away from the drill string 120, such as may permit the iron roughneck 165 to move clear of the drill string 120 during drilling operations. The spinner of the iron roughneck 165 may be utilized to apply low torque to make up and break out threaded connections between tubulars of the drill string 120, and the torque wrench may be utilized to apply a higher torque to tighten and loosen the threaded connections.

A set of slips 162 may be located on the rig floor 114, such as may accommodate therethrough the drill string 120 during tubular make up and break out operations, tubular running operations, and drilling operations. The slips 162 may be in an open position during running and drilling operations to permit advancement of the drill string 120, and in a closed position to clamp the upper end (e.g., uppermost tubular) of the drill string 120 to thereby suspend and prevent advancement of the drill string 120 within the wellbore 102, such as during the make up and break out operations.

The surface equipment 110 of the well construction system 100 may also comprise a control center 190 from which various portions of the well construction system 100, such as the top drive 116, the hoisting system, the tubular handling system, the drilling fluid circulation system, the well control system, the BHA, among other examples, may be monitored and controlled. The control center 190 may be located on the rig floor 114 or another location of the well construction system 100, such as the wellsite surface 104. The control center 190 may comprise a facility 191 (e.g., a room, a cabin, a trailer, etc.) containing a control workstation 197, which may be operated by a human wellsite operator 195 to monitor and control various wellsite equipment or portions of the well construction system 100. The control workstation 197 may comprise or be communicatively connected with a processing device 192 (e.g., a controller, a computer, etc.), such as may be operable to receive, process, and output information to monitor operations of and provide control to one or more portions of the well construction system 100. For example, the processing device 192 may be communicatively connected with the various surface and downhole equipment described herein, and may be operable to receive signals from and transmit signals to such equipment to perform various operations described herein. The processing device 192 may store executable program code, instructions, and/or operational parameters or set-points, including for implementing one or more aspects of methods and operations described herein. The processing device 192 may be located within and/or outside of the facility 191.

The control workstation 197 may be operable for entering or otherwise communicating control commands to the processing device 192 by the wellsite operator 195, and for displaying or otherwise communicating information from the processing device 192 to the wellsite operator 195. The control workstation 197 may comprise a plurality of human-machine interface (HMI) devices, including one or more input devices 194 (e.g., a keyboard, a mouse, a joystick, a touchscreen, etc.) and one or more output devices 196 (e.g., a video monitor, a touchscreen, a printer, audio speakers, etc.). Communication between the processing device 192, the input and output devices 194, 196, and the various wellsite equipment may be via wired and/or wireless communication means. However, for clarity and ease of understanding, such communication means are not depicted, and a person having ordinary skill in the art will appreciate that such communication means are within the scope of the present disclosure.

Well construction systems within the scope of the present disclosure may include more or fewer components than as described above and depicted in FIG. 1. Additionally, various equipment and/or subsystems of the well construction system 100 shown in FIG. 1 may include more or fewer components than as described above and depicted in FIG. 1. For example, various engines, motors, hydraulics, actuators, valves, and/or other components not explicitly described herein may be included in the well construction system 100, and are within the scope of the present disclosure.

The present disclosure is further directed to various implementations of systems and/or methods for monitoring and controlling drilling operations to increase performance (e.g., increase rate of penetration) of the drilling operations and reduce stick-slip. The systems and/or methods within the scope of the present disclosure may be utilized to monitor (i.e., measure) and control operational parameters of the top drive 116 based on predetermined operational set-points and/or performance indicators (e.g., indexes) calculated in real-time during drilling operations. For example, the systems and/or methods within the scope of the present disclosure may calculate performance indicators and display the performance indicators to a driller or other drill rig personnel (e.g., wellsite operators 195) in a predetermined manner, such as may permit the driller to change drilling parameters (e.g., weight on bit, rotational speed of the top drive, activate a drilling system torque control, change control parameters of the drilling system torque control, etc.) based on the performance indicators to increase performance and reduce stick-slip. Systems and/or methods within the scope of the present disclosure may also or instead automatically change the drilling parameters based on the performance indicators to increase performance and reduce stick-slip.

Figure 2:
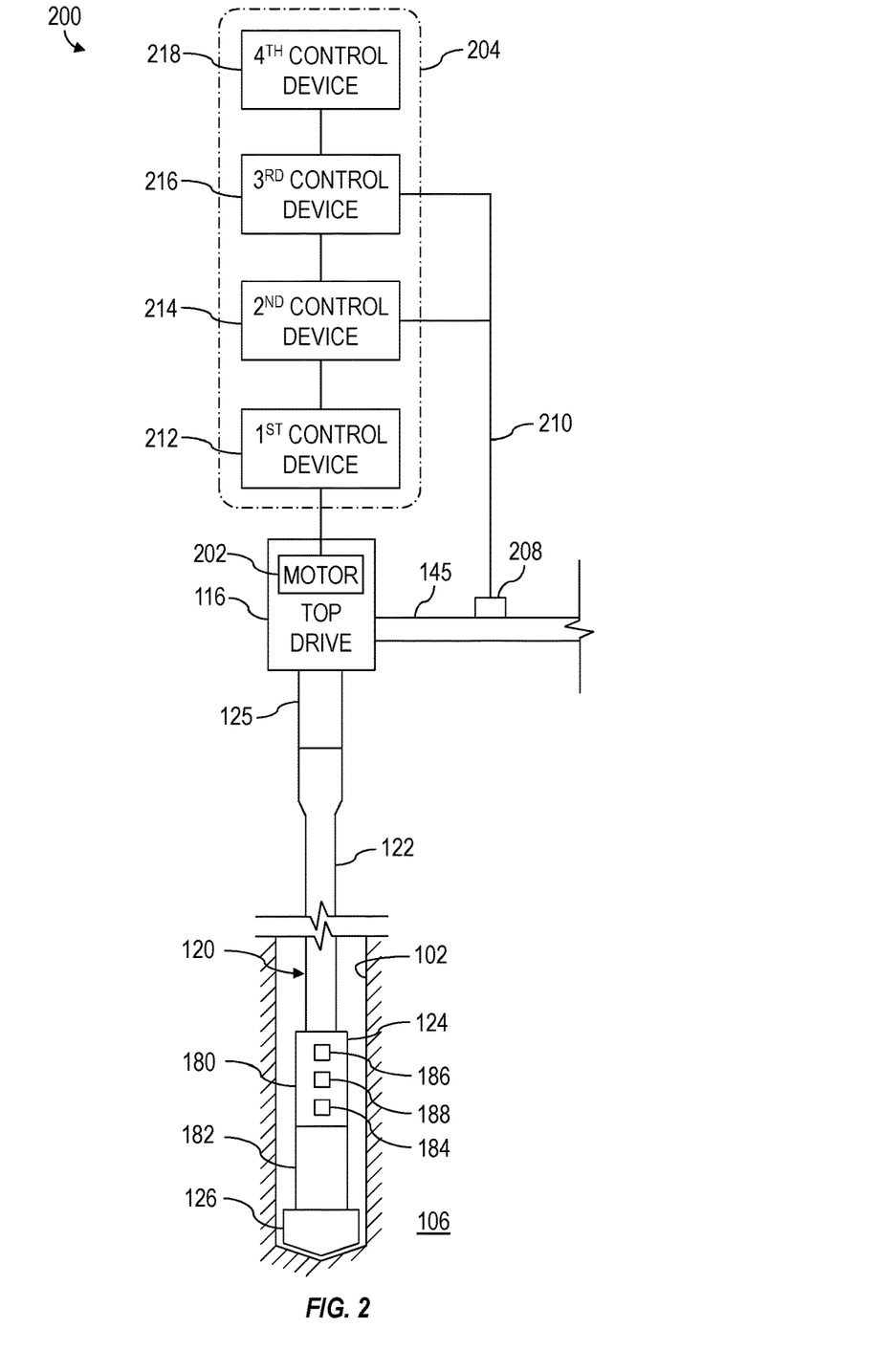
FIG. 2 is a schematic view of at least a portion of an example implementation of apparatus according to one or more aspects of the present disclosure.

FIG. 2 is a schematic view of at least a portion of an example implementation of a control system 200 for monitoring and controlling operation of a top drive 116 according to one or more aspects of the present disclosure. The control system 200 may form a portion of or operate in conjunction with the well construction system 100 shown in FIG. 1 and, thus, may comprise one or more features of the well construction system 100 shown in FIG. 1, including where indicated by the same reference numerals. Accordingly, the following description refers to FIGS. 1 and 2, collectively.

The top drive 116 may comprise an electric motor 202 operatively connected to a drive shaft 125 of the top drive 116 via a transmission or gear box (not shown). During drilling operations, the drive shaft 125 may be coupled with the top end of a drill string 120 terminating at the lower end with a BHA 124. The BHA 124 may include a downhole tool 180 and a mud motor 182 configured to rotate a drill bit 126. The control system 200 may be utilized to monitor and/or control drilling operations, at least partially, based on rotational speed of the drill bit 126.

The control system 200 may comprise one or more control devices 204 (e.g., information processing devices), such as, for example, variable frequency drives (VFDs), programmable logic controllers (PLCs), computers (PCs), industrial computers (IPC), or other controllers equipped with control logic, communicatively connected with various sensors and actuators of the BHA 124, the top drive 116, and/or other portions of the control system 200. One or more of the control devices 204 may be in real-time communication with such sensors and actuators, and utilized to monitor and/or control various portions, components, and equipment of the top drive 116 and/or the BHA 124. Communication between one or more of the control devices 204 and the sensors and actuators may be via wired and/or wireless communication means 205. A person having ordinary skill in the art will appreciate that such communication means are within the scope of the present disclosure.

One or more of the downhole tools 180 may be or comprise a MWD or LWD tool comprising downhole sensors 184 operable for the acquisition of measurement data pertaining to the BHA 124, including rotational speed of the drill bit 126. The downhole sensors 184 may comprise one or more rotation sensors operatively connected with and/or disposed in association with the drill bit 126, the downhole motor 182, and/or other portions of the BHA 124. The rotation sensors may be operable to output or otherwise facilitate downhole rotational position and/or downhole rotational speed data (e.g., sensor signals, sensor information, sensor measurements) indicative of or operable to facilitate determination of rotational (i.e., angular) position and/or speed of the drill bit 126. The rotation sensors may be communicatively connected with one or more of the control devices 204 and operable to output the rotational position and/or speed measurements to one or more of the control devices 204. The rotation sensors may be or comprise, for example, gyros and/or magnetometers.

One or more of the downhole tools 180 and/or another portion of the BHA 124 may also comprise a downhole telemetry device 186 operable to communicate with one or more of the control devices 204, such as via mud-pulse telemetry. One or more of the downhole tools 180 and/or another portion of the BHA 124 may also comprise a downhole processing device 188 operable to receive, process, and/or store information received from the surface equipment 110, the downhole sensors 184, and/or other portions of the BHA 124. The processing device 188 may also store executable computer programs (e.g., program code instructions), including for implementing one or more aspects of the operations described herein.

Communication (i.e., telemetry) between the BHA 124 and the one or more of the control devices 204 may be via mud-pulse telemetry (i.e., pressure pulses) sent through the drilling fluid flowing within a fluid passage 121 of the drill string 120. For example, the downhole telemetry device 186 may comprise a modulator selectively operable to cause pressure changes (e.g., pulsations, fluctuations) in the drilling fluid flowing within the fluid passage 121 of the conveyance means 122, the top drive 116, and/or a fluid delivery line 145. During operations, the downhole telemetry device 186 may modulate the pressure of the drilling fluid within the fluid passage 121 to transmit downhole data (e.g., uplink mud-pulse telemetry data), including rotational speed data, received from the processing device 188, the downhole sensors 184, and/or other portions of the BHA 124 in the form of pressure pulses. The modulated pressure pulses travel uphole along the drilling fluid through the fluid passage 121, the top drive 116, and the fluid delivery line 145 to be detected by an uphole telemetry device 208. The uphole telemetry device 208 may comprise a pressure transducer or sensor in contact with the drilling fluid being pumped downhole. The uphole telemetry device 208 may, thus, be disposed along or in connection with the fluid delivery line 145, the top drive 116, and/or another conduit or device transferring or in contact with the drilling fluid being pumped downhole. The uphole telemetry device 208 may be operable to detect the modulated pressure pulses, convert the pressure pulsed to electrical or other signals, and communicate the electrical signals to one or more of the control devices 204 via wired and/or wireless communication means 210. The control devices 204 may be operable to interpret the electrical signals to reconstruct the downhole data transmitted by the downhole telemetry device 186. The downhole data may also or instead be transmitted uphole to one or more of the control devices 204 via wired drill pipe, which may be utilized to form the conveyance means 122 of the drill string 120.

The control devices 204 may be divided into or otherwise comprise hierarchical control levels or layers. A first control level may comprise a first control device 212 (i.e., an actuator control device), such as, for example, a VFD operable to directly power and control (i.e., drive) the electric motor 202 of the top drive 116. The first control device 212 may be electrically connected with the electric motor 202. The first control device 212 may be installed or otherwise disposed in a designated facility (e.g., a top drive VFD house) located on the drill floor 114. The first control device 212 may be operable to control operation (e.g., rotational speed and torque) of the electric motor 202 and, thus, the drive shaft 125 of the top drive 116. The first control device 212 may control electrical power (e.g., current, voltage, frequency) delivered to the electric motor 202. The first control device 212 may be further operable to calculate or determine torque and/or rotational speed generated or output by the electric motor 202, such as based on the electrical power (e.g., current, voltage, frequency) delivered to the electric motor 202. The first control device 212 may, thus, be operable to output or otherwise facilitate torque measurements (e.g., signals or information) indicative of or operable to facilitate determination of torque output to the drill string 120 by the top drive 116. The first control device 212 may be communicatively connected with one or more of the other control devices 204 and operable to output the torque measurements to one or more of the other control devices 204. The first control device 212 may be further operable to output or otherwise facilitate rotational position, rotational distance, rotational speed, and/or acceleration measurements indicative of or operable to facilitate determination of rotational position, rotational distance, rotational speed, and/or acceleration of the top drive 116.

A second control level may comprise a second control device 214 (i.e., a direct control device), such as, for example, a PLC operable to control the electric motor 202 of the top drive 116 via the first control device 212. The second control device 214 may be imparted with and operable to execute program code instructions, such as rigid computer programing. The second control device 214 may be a local control device disposed in association with the top drive 116 or another portion of the drill string drive system of the well construction system 100 and operable to control the top drive 116 and/or other portions of the drill string drive system. The second control device 214 may be communicatively connected with the first control device 212 and operable to receive torque and other measurements from the first control device 212 and output control signals or information to the first control device 212 to control the rotational position, rotational distance, rotational speed, and/or torque of the motor 202. The second control device 214 may be communicatively connected with the uphole telemetry device 208 and operable to receive rotational position, rotational speed, and/or rotational acceleration measurements outputted by the downhole sensors 184 via the uphole telemetry device 208. The second control device 214 may have or operate at a sampling rate between about ten hertz (Hz) and about one kilohertz (kHz).

A third control level may comprise a third control device 216 (i.e., a coordinated control device), such as, for example, a PC, an IPC, and/or another processing device. The third control device 216 may be imparted with and operable to execute program code instructions, including high level programming languages, such as C, and C++, among other examples, and may be used with program code instructions running in a real-time operating system (RTOS). The third control device 216 may be a system-wide control device operable to control a plurality of devices and/or subsystems of the well construction system 100. The third control device 216 may be or form at least a portion of the processing device 192 shown in FIG. 1. The third control device 216 may be operable to control the electric motor 202 of the top drive 116 via the first and second control device 212, 214. The third control device 216 may be communicatively connected with the second control device 214 and operable to receive torque and other measurements from the first control device 212 via the second control device 214. The third control device 216 may be operable to output control signals or information to the first control device 212 via the second control device 214 to control the rotational position, rotational distance, rotational speed, and/or torque of the motor 202. The third control device 216 may be communicatively connected with the uphole telemetry device 208 and operable to receive rotational position, rotational speed, and/or rotational acceleration measurements outputted by the downhole sensors 184 via the uphole telemetry device 208. The third control device 216 may have or operate at a sampling rate between about ten Hz and about 100 Hz.

A fourth control level may comprise a fourth control device 218 (i.e., an orchestration control device), such as, for example, a PC, an IPC, and/or another processing device. The fourth control device 218 may be imparted with and operable to execute program code instructions, including orchestration software for high-level control of the drilling operations of the well construction system 100. The fourth control device 218 may be or form at least a portion of the processing device 192 shown in FIG. 1. The fourth control device 218 may be operable to control the electric motor 202 of the top drive 116 via the first, second, and third control device 212, 214, 216. The fourth control device 218 may be communicatively connected with the third control device 214 and operable to receive torque and other measurements from the first control device 212 via the second and third control devices 214, 216. The fourth control device 218 may be operable to output control signals or information to the first control device 212 via the second and third control devices 214, 216 to control the rotational position, rotational distance, rotational speed, and/or torque of the motor 202. The fourth control device 218 may have or operate at a sampling rate ranging from about one or several seconds to about one or several minutes.

Figure 3:
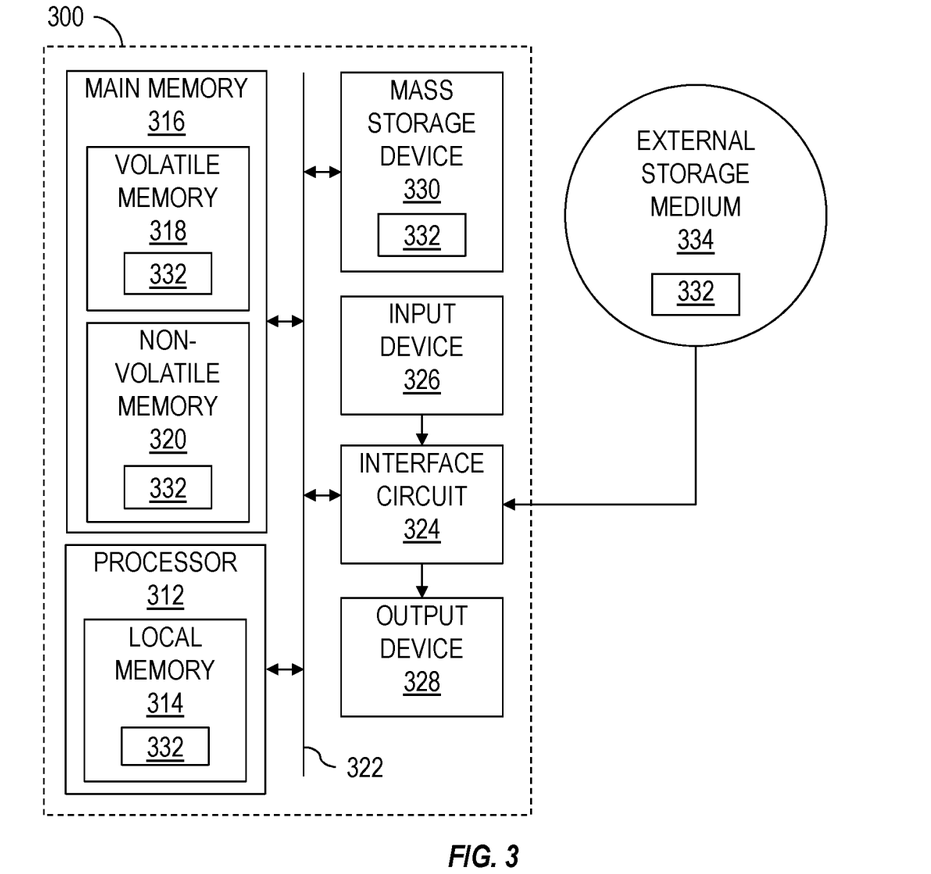
FIG. 3 is a schematic view of at least a portion of an example implementation of apparatus according to one or more aspects of the present disclosure.

FIG. 3 is a schematic view of at least a portion of an example implementation of a processing device 300 (or system) according to one or more aspects of the present disclosure. The processing device 300 may be or form at least a portion of one or more processing devices, equipment controllers, and/or other electronic devices shown in one or more of the FIGS. 1 and 2. Accordingly, the following description refers to FIGS. 1-3, collectively.

The processing device 300 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices. The processing device 300 may be or form at least a portion of the processing devices 192, 188 shown in FIG. 1. The processing device 300 may be or form at least a portion of the control devices 212, 214, 216, 218 shown in FIG. 2. Although it is possible that the entirety of the processing device 300 is implemented within one device, it is also contemplated that one or more components or functions of the processing device 300 may be implemented across multiple devices, some or an entirety of which may be at the wellsite and/or remote from the wellsite.

The processing device 300 may comprise a processor 312, such as a general-purpose programmable processor. The processor 312 may comprise a local memory 314, and may execute machine-readable and executable program code instructions 332 (i.e., computer program code) present in the local memory 314 and/or another memory device. The processor 312 may execute, among other things, the program code instructions 332 and/or other instructions and/or programs to implement the example methods, processes, and/or operations described herein. For example, the program code instructions 332, when executed by the processor 312 of the processing device 300, may cause a top drive 116 to perform example methods and/or operations described herein. The program code instructions 332, when executed by the processor 312 of the processing device 300, may also or instead cause the processor 312 to receive and process sensor data (e.g., sensor measurements), and output control commands to the motor 202 of the top drive 116 based on predetermined set-points and the received and/or processed sensor data.

The processor 312 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 312 include one or more INTEL microprocessors, microcontrollers from the ARM and/or PICO families of microcontrollers, embedded soft/hard processors in one or more FPGAs.

The processor 312 may be in communication with a main memory 316, such as may include a volatile memory 318 and a non-volatile memory 320, perhaps via a bus 322 and/or other communication means. The volatile memory 318 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 320 may be, comprise, or be implemented by read-only memory, flash memory, and/or other types of memory devices. One or more memory controllers (not shown) may control access to the volatile memory 318 and/or non-volatile memory 320.

The processing device 300 may also comprise an interface circuit 324, which is in communication with the processor 312, such as via the bus 322. The interface circuit 324 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 324 may comprise a graphics driver card. The interface circuit 324 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing device 300 may be in communication with various sensors, video cameras, actuators, processing devices, equipment controllers, and other devices of the well construction system via the interface circuit 324. The interface circuit 324 can facilitate communications between the processing device 300 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol.

One or more input devices 326 may also be connected to the interface circuit 324. The input devices 326 may permit human wellsite operators 195 (e.g., a driller, other drill rig personnel) to enter the program code instructions 332, which may be or comprise control commands, operational parameters, operational thresholds, and/or other operational set-points. The program code instructions 332 may further comprise modeling or predictive routines, equations, algorithms, processes, applications, and/or other programs operable to perform example methods, calculations, and/or operations described herein. The input devices 326 may be, comprise, or be implemented by a keyboard, a mouse, a joystick, a touchscreen, a track-pad, a trackball, an isopoint, and/or a voice recognition system, among other examples. One or more output devices 328 may also be connected to the interface circuit 324. The output devices 328 may permit for visualization or other sensory perception of various data, such as sensor data, status data, and/or other example data. The output devices 328 may be, comprise, or be implemented by video output devices (e.g., an LCD, an LED display, a CRT display, a touchscreen, etc.), printers, and/or speakers, among other examples. The one or more input devices 326 and the one or more output devices 328 connected to the interface circuit 324 may, at least in part, facilitate the HMIs described herein.

The processing device 300 may comprise a mass storage device 330 for storing data and program code instructions 332. The mass storage device 330 may be connected to the processor 312, such as via the bus 322. The mass storage device 330 may be or comprise a tangible, non-transitory storage medium, such as a floppy disk drive, a hard disk drive, a compact disk (CD) drive, and/or digital versatile disk (DVD) drive, among other examples. The processing device 300 may be communicatively connected with an external storage medium 334 via the interface circuit 324. The external storage medium 334 may be or comprise a removable storage medium (e.g., a CD or DVD), such as may be operable to store data and program code instructions 332.

As described above, the program code instructions 332 and other data (e.g., sensor data or measurements database) may be stored in the mass storage device 330, the main memory 316, the local memory 314, and/or the removable storage medium 334. Thus, the processing device 300 may be implemented in accordance with hardware (perhaps implemented in one or more chips including an integrated circuit, such as an ASIC), or may be implemented as software or firmware for execution by the processor 312. In the case of firmware or software, the implementation may be provided as a computer program product including a non-transitory, computer-readable medium or storage structure embodying computer program code instructions 332 (i.e., software or firmware) thereon for execution by the processor 312. The program code instructions 332 may include program instructions or computer program code that, when executed by the processor 312, may perform and/or cause performance of example methods, calculations, processes, and/or operations described herein.

The well construction system 100 and/or the control system 200 may be utilized to perform drilling operations by selectively rotating the drill bit 126 via the top drive 116 and/or the mud motor 182. During normal (e.g., non-directional) drilling operations, known in the oil and gas industry as "rotary drilling", both the top drive 116 and the mud motor 182 may rotate the drill bit 126 resulting in a total drill bit rotational rate that is equal to the rotational rates of both the top drive 116 and the mud motor 182. Because friction between the drill string 120 and the formation 106 (i.e., sidewall of the wellbore 102) changes, the drill bit 126 and/or other portions of the BHA 124 often experience stick slip. The stick slip phenomenon can be characterized, for example, by monitoring and analyzing downhole rotational speed data for cyclic variations of one or more portions of the drill string 120, such as the drill bit 126, another portion of the BHA 124, a drill collar, and/or another portion of the drill string 120.

Figure 4:
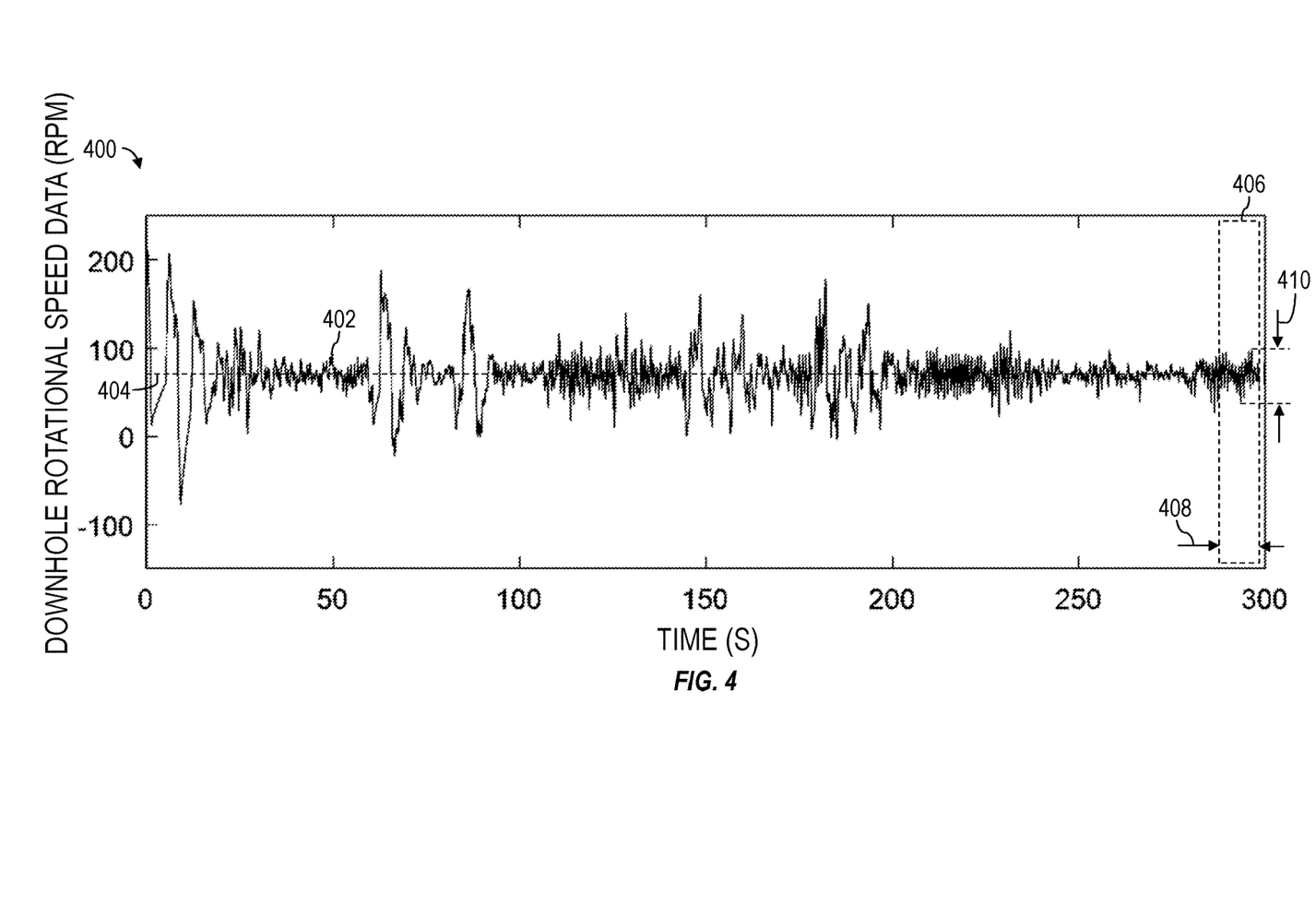
FIG. 4 is a graph according to one or more aspects of the present disclosure.

FIG. 4 is a graph 400 showing example raw downhole rotational speed data 402 (e.g., sensor measurements) outputted by one or more downhole sensors 184 shown in FIGS. 1 and 2 according to one or more aspects of the present disclosure. The downhole rotational speed data (e.g., revolutions per minute (RPM)) is shown plotted along the vertical axis, with respect to time (e.g., seconds (S)), which is shown plotted along the horizontal axis. The graph 400 may be generated by a processing device, such as the processing device 300 shown in FIG. 3 or one or more of the control devices 204 shown in FIG. 2, and outputted on a visual (e.g., video) output device 196. The following description refers to FIGS. 1-4, collectively.

The raw downhole rotational speed data 402 is highly erratic, continuously changing with respect to a nominal rotational speed set-point 404. The downhole rotational speed data 402 can be difficult to interpret by a driller or other drill rig personnel to ascertain performance of drilling operations and/or presence and severity of drilling problems, such as stick-slip and other oscillations. However, the raw downhole rotational speed data 402 mandates a large transmission band width to facilitate communication to the wellsite surface 104. Thus, the raw downhole rotational speed data 402 is generally not available to the driller. Accordingly, the driller oftentimes relies on other information to make decisions.

The present disclosure is further directed to real-time measurement and analysis of downhole rotational speed data to calculate an index (i.e., a numerical indicator) of downhole rotational speed oscillations, which may be referred to hereinafter as a downhole oscillation performance index (DOPI). DOPI may be calculated in real-time based on current downhole rotational speed data and utilized in real-time by surface drillers and/or other wellsite personnel to determine severity of downhole oscillations, take mitigation actions accordingly and timely, and make performance comparisons and analysis. DOPI is a measure of severity (i.e., magnitude) of downhole oscillations that changes over time and in response to different subterranean formations. DOPI comprises a ratio (i.e., a fractional value) having a numerator and a denominator. DOPI values may be normalized based on a fixed reference speed, such as may help drillers and other drill rig personnel to understand a changing DOPI value. Accordingly, a constant denominator may be utilized to normalize DOPI values. DOPI values may be calculated based on downhole rotational speed of one or more portions of the drill string 120, such as the drill bit 126, another portion of the BHA 124, a drill collar, and/or another portion of the drill string 120.

The numerator of DOPI may be or comprise a difference between highest (i.e., maximum) and lowest (i.e., minimum) downhole rotational speed values calculated over or encompassed within a dynamically and/or automatically determined time window 406 (i.e., time period). Such difference may be or comprise peak-to-peak amplitude 410 between one or more of the highest and lowest measurements of downhole rotational speed data 402 encompassed within the time window 406. Time length 408 of the time window 406 may be calculated based on physical characteristics of the drill string 120, including the fundamental rotational oscillation time period of the drill string 120. The numerator may be normalized by the constant denominator, which may be or comprise a configurable constant rotational speed value, such as the maximum control speed of the top drive, the base speed of the top drive, or a rotational speed set-point value (e.g., 100 RPM), among other examples. The numerator may also or instead be normalized by an average of the rotational speed data (i.e., average rotational speed) calculated over or encompassed within the time window 406, used as the denominator. DOPI values can be calculated and reported (e.g., visually presented) in real-time to the driller or other drill rig personnel via a visual (e.g., video) display device. DOPI values are indicative of downhole oscillation severity and can be categorized into different levels with configurable category intervals. Thus, DOPI values can be displayed in a customizable display screen to emphasize different DOPI values falling within different levels or categories of severity of downhole oscillations. DOPI values recorded over time can be used offline or at a later time for performance comparisons and analysis. DOPI values can be calculated (e.g., via the processing device 188) downhole and sent to the surface via a telemetry system (e.g., mud pulse, electromagnetic, wired drill pipe, etc.), or the raw downhole rotational speed data can be sent to the surface via the wired drill pipe and/or telemetry system and DOPI values can be calculated (e.g., via the processing device 192) at the surface. However, the numerators of the DOPI values can be calculated downhole and sent to the surface via the wired drill pipe and/or telemetry system. The numerators may then be divided (e.g., via the processing device 192) at the surface by the selected constant denominator, such as the rotational speed set-point.

The present disclosure is further directed to example operations, processes, and/or methods of calculating or otherwise determining DOPI according to one or more aspects of the present disclosure. The example methods may be performed utilizing or otherwise in conjunction with at least a portion of one or more implementations of one or more instances of the apparatus shown in one or more of FIGS. 1-4, and/or otherwise within the scope of the present disclosure. For example, the methods may be performed and/or caused, at least partially, by a processing device, such as the processing device 300 executing program code instructions according to one or more aspects of the present disclosure. Thus, the present disclosure is also directed to a non-transitory, computer-readable medium comprising computer program code that, when executed by the processing device, may cause such processing device to perform the example methods described herein. The methods may also or instead be performed and/or caused, at least partially, by a human wellsite operator utilizing one or more instances of the apparatus shown in one or more of FIGS. 1-4, and/or otherwise within the scope of the present disclosure. However, the method may also be performed in conjunction with implementations of apparatus other than those depicted in FIGS. 1-4 that are also within the scope of the present disclosure.

Figure 5:
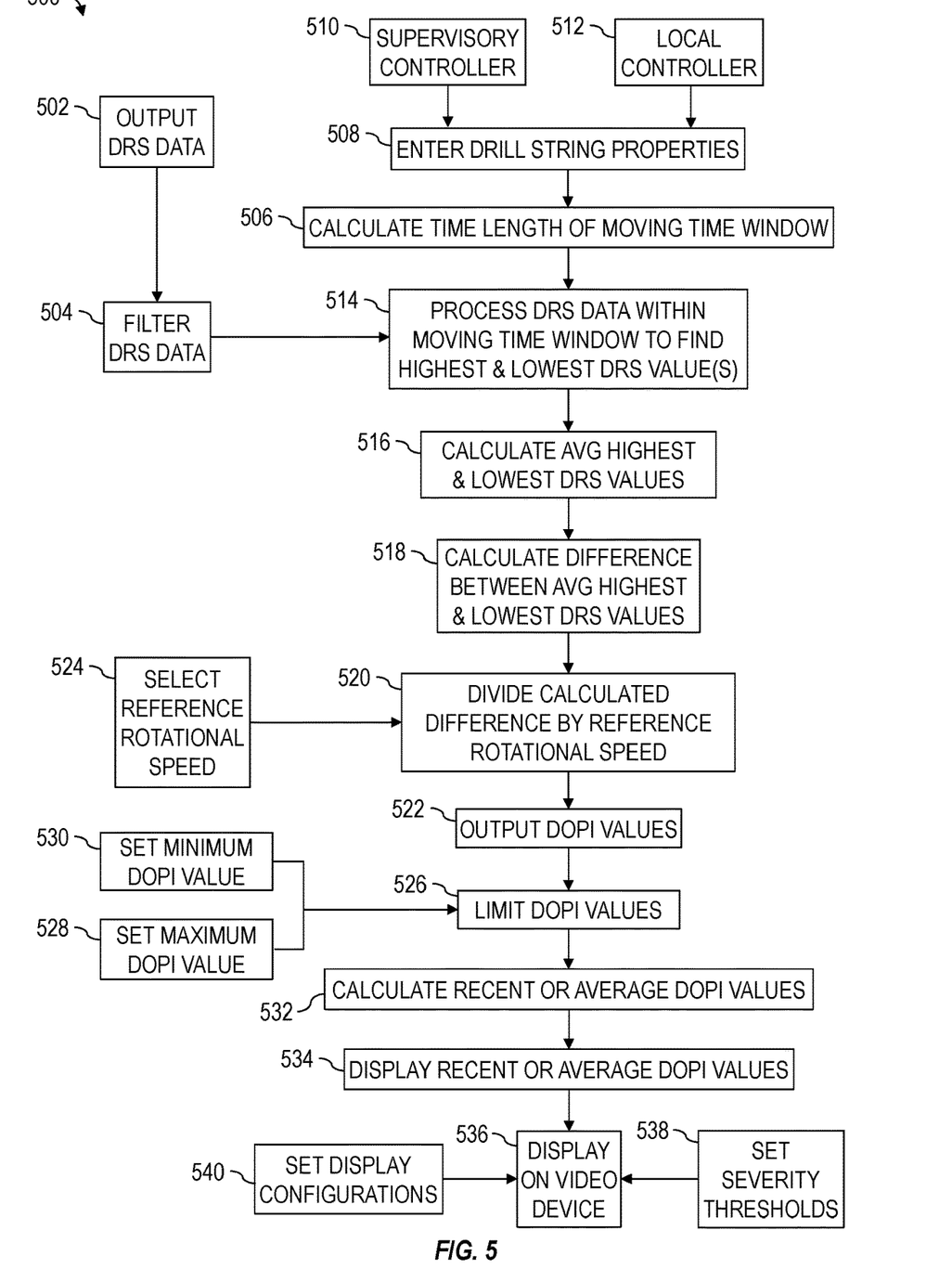
FIG. 5 is a flow-chart diagram of at least a portion of a method according to one or more aspects of the present disclosure.

FIG. 5 is a flow-chart diagram of an example method (500) for continually calculating and outputting DOPI values based on continually updated or otherwise received downhole rotational speed data 402 according to one or more aspects of the present disclosure. The following description refers to FIGS. 1-4, collectively.

The method (500) may comprise outputting (502) and/or recording in real-time present values (i.e., measurements) of downhole rotational speed (DRS) data 402 indicative of downhole rotational speed of a drill bit 126, a BHA 124, a drill collar, or another downhole portion of a drill string 120. The downhole rotational speed data 402 may be filtered (504) via low pass filtering or band pass filtering. Cutoff rotational frequencies to be filtered may comprise predetermined fixed values. For example, if a subterranean formation 106 to be drilled to form a wellbore 102 is known as being fairly constant, a low pass filter may be applied, otherwise, a band pass filter may be applied.

The method (500) may further comprise calculating (506) time length 408 of a time window 406 that will encompass a portion of the downhole rotational speed data 402 that will be processed or otherwise used to calculate the DOPI values. In other words, the downhole rotational speed data 402 encompassed within or during the time window 406 will be processed or otherwise used to calculate the DOPI values. The time length 408 of the time window 406 may be calculated based on physical properties (508) of the drill string 120, such as a fundamental rotational oscillation time period of the drill string 120 used to drill the wellbore 102. The fundamental oscillation time period may be calculated based on the physical (e.g., mechanical) properties (508) of the drill string 120, such as the length of the drill string 120 (e.g., depth of the wellbore 102 drilled), density of the drill string 120, moment of inertia of the drill string 120, and other properties of the drill string 120, which may be entered by drill rig personnel and received via a local controller (510), such as a second control device 214, and/or a supervisory controller (512), such as third and fourth control devices 216, 218 at higher level of a hierarchical control network. The calculations described below may be performed by a processing device, such as the processing device 300 shown in FIG. 3, which may be implemented as part of the local controller (510), the supervisory controller (512), and/or the downhole processing device 188, which may then output the results to the surface 104.

The fundamental time period may be calculated via Equations (1)-(3), set forth below, based on various physical properties of the drill string 120. However, it is to be understood that other equations, means, and techniques may also or instead be utilized to calculate the fundamental time period of the drill string 120.

$$t_1 = 2\pi/\sqrt{K/J} \quad (1)$$

$$K = GI_1/L_1 \quad (2)$$

$$J = \frac{\rho l_1 L_1}{3} + \rho l_2 L_2 \quad (3)$$

where $t_1$ is the fundamental time period of the drill string, K is the stiffness of the drill string 120, J is the moment of inertia of the drill string 120, G is the shear modulus of the drill string 120, $I_1$ and $I_2$ are polar moments of drill pipes and drill collars, respectively, making up the drill string 120, $\rho$ is density of the drill string 120, and $l_1$ and $l_2$ are the total length of the drill pipes and drill collars, respectively, making up the drill string 120.

The time length 408 of the time window 406 may then be calculated based on the fundamental time period $t_1$, such as via Equation (4) set forth below.

$$t = \alpha t_1 \quad (4)$$

where t is the time length 408 of the time window 406 and $\alpha$ is a safety factor that may be set between 1.0 and 2.0, such as to ensure the time length 408 will cover a full (e.g., whole, complete) oscillation cycle.

A sample size of the downhole rotational speed data encompassed within the time window 406 and processed to calculate the DOPI values can be calculated by multiplying the time length 408 by the rate at which the downhole rotational speed data is sampled. The time length 408 of the time window 406 may be rounded to a nearest integer. As described above, the time length 408 of the time window 406 depends on the fundamental oscillation time period $t_1$ of the drill string 120 and, thus, on the length of the drill string 120. Accordingly, when the wellbore 102 is shallow and the drill string 120 relatively short, the time length 408 of the time window 406 may be relatively short (e.g., about one second). However, when the wellbore 102 is deep and the drill string 120 relatively long, the time length 408 of the time window 406 may be relatively long (e.g., ten seconds, 15 seconds, 20 seconds, or more).

As described above, the downhole rotational speed data encompassed within the time window 406 (i.e., the stored downhole rotational speed value array having a size of the time window 406) may be processed (514) to calculate the DOPI values. The time window 406 may encompass new rotational speed data 402 being received by the processing device and a portion of the previously received (i.e., recorded) rotational speed data ranging back in time by the calculated time length 408. Thus, the time window 406 may encompass the rotational speed data received over the latest period of time that is equal to the calculated time length 408. Because the time window encompasses newly received rotational speed data and discards older rotational speed data, the time window may be described as a "moving" time window.

The downhole rotational speed data encompassed within the time window 406 may be received and processed (514) by the processing device (e.g., the processing device 188, 192) to calculate a highest rotational speed variation (i.e., largest peak to peak rotational speed amplitude 410) among or within the downhole rotational speed data 402 encompassed within the time window 406. The highest rotational speed variation can be calculated by finding within the time window 406 one or a plurality of highest values of the downhole rotational speed data 402 and one or a plurality of lowest values of the downhole rotational speed data 402. The highest values of the downhole rotational speed data 402 and/or the lowest values of the downhole rotational speed data 402 may each comprise a sample size of one, two, three, four, five, or more instances (e.g., measurements, values) of the downhole rotational speed data 402 within the time window 406. Sample sizes of the highest values of the downhole rotational speed data 402 and of the lowest values of the downhole rotational speed data 402 may be different. The highest values of the downhole rotational speed data 402 may be averaged to calculate (516) an average highest downhole rotational speed value and the lowest values of the downhole rotational speed data may be averaged to calculate an average lowest downhole rotational speed value. The highest rotational speed variation may then be calculated by calculating (518) a difference between the average highest downhole rotational speed value and the average lowest downhole rotational speed value. However, if a single highest value of the downhole rotational speed data 402 and a single lowest value of the downhole rotational speed data 402 is used, the highest rotational speed variation may be calculated by calculating (518) a difference between the highest downhole rotational speed value and the downhole rotational speed value.

The highest rotational speed variation (i.e., the calculated (518) differences) may then be sent to the surface processing device, if calculated downhole, and divided (520) by a predetermined constant reference rotational speed (i.e., a denominator), which may be selected (524) by drill rig personnel or otherwise predetermined. However, the predetermined constant reference rotational speed may be transmitted downhole from the surface and the highest rotational speed variation may be divided (520) by the predetermined constant reference rotational speed downhole. The reference rotational speed may be or comprise a rotational speed associated with the drill string 120 that remains constant during drilling operations. For example the reference rotational speed may be or comprise a maximum speed rating of the top drive 116 or a set-point (e.g., nominal, average) operating speed of the top drive 116. The reference rotational speed may also be a randomly selected rotational speed, such as 100 RPM. Dividing (520) the highest rotational speed variation by the reference rotational speed results in a DOPI value, which may be outputted (522) by the processing device. The reference rotational speed may be selected (524) based on availability and/or choice of the drill rig personnel. Because DOPI is a ratio or quotient of the highest rotational speed variation and the reference rotational speed, DOPI may be viewed as a percentage (%) value of the reference rotational speed. The actions (502)-(522) may be continually repeated by the processing device during drilling operations to continually calculate and output new DOPI values.

Figure 6:
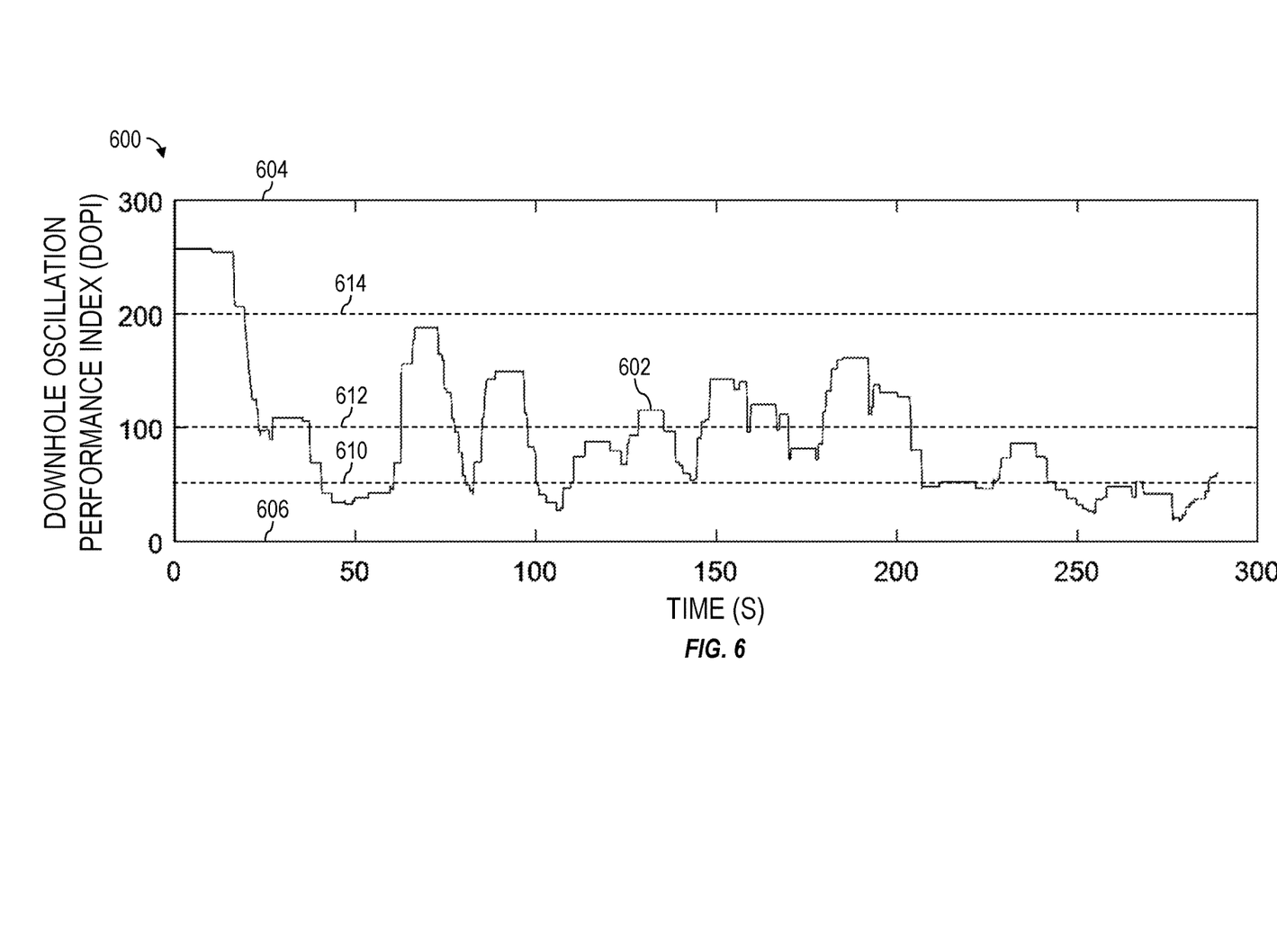
FIG. 6 is a graph according to one or more aspects of the present disclosure.

The DOPI values that are continually calculated may be outputted (522) to a visual output device 196 to be displayed (536). FIG. 6 is a graph 600 showing example DOPI values 602 calculated based on the downhole rotational speed data 402 encompassed within the time window 406 shown in FIG. 4 according to one or more aspects of the present disclosure. The DOPI values 602 are shown plotted along the vertical axis, with respect to time (e.g., seconds (S)), which is shown plotted along the horizontal axis. The graph 600 may be generated by a processing device, such as the processing device 300 shown in FIG. 3 or one or more of the control devices 204 shown in FIG. 2 and outputted to the visual output device 196. The DOPI values 602 may be continually calculated based on the downhole rotational speed data 402 encompassed within the time window 406. Thus, the DOPI values 602 may be outputted by the processing device to the visual output device 196 after each sample or instance of the downhole rotational speed data 402 encompassed within the time window 406 is received and processed by the processing device.

The DOPI values 602 shown on the graph 600 displayed (536) on the visual output device 196 may be limited (526) by setting (528) a maximum value 604 (e.g. 300) for the DOPI values 602 shown on the graph 600 and setting (530) a minimum value 606 (e.g., zero) for the DOPI values 602 shown on the graph 600. DOPI values outside of the maximum and minimum values 604, 606 may be discarded or not displayed. Furthermore, if an update time of the visual output device 196 is longer (i.e., slower) than the rate at which the downhole rotational speed data is sampled, a most recent value (e.g., polling method) or an average value of the downhole rotational speed data and/or of the DOPI values may be calculated (532) and displayed (534).

The method 500 may further comprise setting (538) severity thresholds 610, 612, 614 (e.g., categories, levels) and setting (540) customized display configurations for the visual display device 196 (e.g., an HMI, a computer monitor) displaying the DOPI values 602. The severity thresholds 610, 612, 614 may be or comprise visual indicators that are configured to inform a driller or other drill rig personnel of the severity (e.g., quality, amplitude) of downhole oscillations associated with the displayed DOPI values 602. For example, the severity thresholds 610, 612, 614 may be indicated by horizontal lines displayed on the visual output device 196 overlaying the DOPI values 602. The areas of the graph 600 associated with (i.e., above and/or below) each severity threshold line 610, 612, 614 may have a different background color indicative of oscillation severity associated with each threshold 610, 612, 614. For example, the area under the threshold line 610 may be green, indicating that drill string oscillations associated with DOPI values 602 falling below the threshold line 610 are low (e.g., substantially smooth). The area under the threshold line 612 and above the threshold line 610 may be yellow, indicating that drill string oscillations associated with DOPI values 602 falling between the threshold lines 610, 612 are moderate. The area under the threshold line 614 and above the threshold line 612 may be blue, indicating that drill string oscillations associated with DOPI values 602 falling between the threshold lines 612, 614 are medium. The area above the threshold line 614 may be red, indicating that drill string oscillations associated with DOPI values 602 falling above the threshold line 614 are high (e.g., serious). The number of thresholds and magnitudes displayed in association with the DOPI values 602 can be customized and configured.

The method (500) described above may be implemented or executed while DOPI calculation operations or functionality is activated or otherwise turned on. However, when the calculation is disabled, such as based on preset drilling conditions (e.g., drill bit off bottom, top drive speed setpoint changes, drilling controller is off, etc.), a null value or a high mark integer value may be assigned to or displayed as a DOPI value, which informs the driller or other drill rig personnel that DOPI calculation functionality is disabled.

One or more portions (e.g., calculations) of the method (500) described above may be performed by a processing device, such as the processing device 300 shown in FIG. 3 or one or more of the control devices 204 (e.g., control device 214 and/or control device 216) shown in FIG. 2. The DOPI values 602 may be communicated to the control device 218 shown in FIG. 2 (i.e., the orchestration layer) permitting the control device 218 to make decisions regarding mitigation of stick-slip. The display of the DOPI values 602, including the DOPI severity thresholds 610, 612, 614 may be performed at or by one or more of the control devices 204 (e.g., the control device 214, the control device 216, the control device 218) shown in FIG. 2. In response to the DOPI values 602 being continuously calculated and/or displayed in real-time, the driller or other drill rig personnel may changes parameters (e.g., decrease weight on bit, decrease rotational speed of the top drive, activate a drilling system torque control, change control parameters of the drilling system torque control, etc.) of the drilling operations based on the viewed DOPI values to reduce or otherwise mitigate severity (e.g., amplitude) of oscillations of the drill string 120 and, thus, improve drilling operations (e.g., increase rate of penetration, reduce stick-slip, decrease drill string wear, etc.). The processing device 300 or one or more of the control devices 204 may also or instead automatically change the drilling parameters based on the calculated DOPI values.

The following description is directed to an example application of the method (500) described above to calculate DOPI values 602 shown on the graph 600 based on the downhole rotational speed data 402 shown on the graph 400. The downhole rotational speed data 402 comprises a 300 second downhole drill bit RPM data set obtained from a field test. The drilling operations were conducted at a wellbore depth and, thus, with a drill string having a length of 15,000 feet. A safety factor α of 1.5 was applied. Based on such parameters and other known physical parameters of the drill string, the time length of the time window 406 for deriving DOPI values was determined (e.g., via Equations (1)-(4) set forth above) to be 10 seconds. The predetermined constant reference speed used as the denominator for DOPI value calculation was the speed rating of the top drive of 112 RPM. During the drilling operations, the top drive speed set-point 404 was 70 RPM. The downhole drill bit RPM data 402 was filtered using a 2 Hz $2^{nd}$ order low pass filter. The DOPI values 602 were then calculated. As shown in graphs 400 and 600, the DOPI values 602 present explicit oscillation performance that closely track the downhole drill bit RPM data 402.

In view of the entirety of the present disclosure, including the figures and the claims, a person of ordinary skill in the art will readily recognize that the present disclosure introduces an apparatus comprising: (A) a rotation sensor operable to facilitate downhole rotational speed data indicative of downhole rotational speed of at least a portion of a drill string during drilling operations; (B) a visual output device; and (C) a processing device comprising a processor and a memory storing computer program code, wherein the processing device is operable to continually: (1) determine a downhole oscillation index by: (a) receiving the downhole rotational speed data; (b) determining a fundamental oscillation time period of the drill string; (c) determining a time length of a time window based on the fundamental oscillation time period; and (d) processing the downhole rotational speed data encompassed within the time window; and (2) output the downhole oscillation index for display on the visual output device to be viewed by a drill rig operator, wherein the drill rig operator changes parameters of the drilling operations based on the downhole oscillation index displayed on the visual output device.

Determining the time length of the time window based on the fundamental oscillation time period may be based on a product of the fundamental oscillation time period and a safety factor.

Processing the downhole rotational speed data may comprise: determining a highest rotational speed variation of the downhole rotational speed data encompassed within the time window; and determining a quotient of the highest rotational speed variation and a predetermined reference rotational speed. Determining the highest rotational speed variation may comprise: determining a highest value of the downhole rotational speed data; determining a lowest value of the downhole rotational speed data; and determining a difference between the highest value and the lowest value. Determining the highest rotational speed variation may comprise: determining a plurality of highest values of the downhole rotational speed data; determining an average highest value of the plurality of highest values of the downhole rotational speed data; determining a plurality of lowest values of the downhole rotational speed data; determining an average lowest value of the plurality of lowest values of the downhole rotational speed data; and determining a difference between the average highest value and the average lowest value. The predetermined reference rotational speed may comprise a rotational speed rating of a top drive, a rotational speed set-point of the top drive, a constant rotational speed value, or an average of the downhole rotational speed data encompassed within the time window.

The processing device may be operable to output control commands to a driver for rotating the drill string to change parameters of the drilling operations based on the determined downhole oscillation index.

The visual output device may be operable to display oscillation severity thresholds overlaying the downhole oscillation index displayed on the visual output device.

The present disclosure also introduces a method comprising commencing operation of a processing device to continually determine a downhole oscillation index by: receiving downhole rotational speed data indicative of downhole rotational speed of at least a portion of a drill string during drilling operations; determining a fundamental oscillation time period of the drill string; determining a time length of a time window based on the fundamental oscillation time period; and processing the downhole rotational speed data encompassed within the time window.

Determining the time length of the time window based on the fundamental oscillation time period may comprise determining a product of the fundamental oscillation time period and a safety factor.

Processing the downhole rotational speed data may comprise: determining a highest rotational speed variation of the downhole rotational speed data encompassed within the time window; and determining a quotient of the highest rotational speed variation and a predetermined reference rotational speed. Determining the highest rotational speed variation may comprise: determining a highest value of the downhole rotational speed data; determining a lowest value of the downhole rotational speed data; and determining a difference between the highest value and the lowest value. Determining the highest rotational speed variation may comprise: determining a plurality of highest values of the downhole rotational speed data; determining an average highest value of the plurality of highest values of the downhole rotational speed data; determining a plurality of lowest values of the downhole rotational speed data; determining an average lowest value of the plurality of lowest values of the downhole rotational speed data; and determining a difference between the average highest value and the average lowest value. The predetermined reference rotational speed may comprise a rotational speed rating of a top drive, a rotational speed set-point of the top drive, a constant rotational speed value, or an average of the downhole rotational speed data encompassed within the time window.

The method may comprise output by the processing device of control commands to a driver for rotating the drill string to change parameters of the drilling operations based on the determining downhole oscillation index.

The method may comprise: displaying the downhole oscillation index on a visual output device to be viewed by a drill rig operator; and changing parameters of the drilling operations by the drill rig operator based on the downhole oscillation index displayed on the visual output device. The method may further comprise displaying on the visual output device oscillation severity thresholds overlaying the downhole oscillation index displayed on the visual output device.

The present disclosure also introduces a method comprising commencing operation of a processing device to continually determine a downhole oscillation index by: receiving downhole rotational speed data indicative of downhole rotational speed of at least a portion of a drill string during drilling operations; determining a highest rotational speed variation among the downhole rotational speed data encompassed within a time window; and determining a quotient of the highest rotational speed variation and a predetermined reference rotational speed.

Operation of the processing device may also comprise determining a time length of the time window. The time length of the time window may be determined by: determining a fundamental oscillation time period of the drill string; and determining a time length of a time window based on the fundamental oscillation time period. The time length of the time window may be determined based on a product of the fundamental oscillation time period and a safety factor.

Determining the highest rotational speed variation may comprise: determining a highest value of the downhole rotational speed data; determining a lowest value of the downhole rotational speed data; and determining a difference between the highest value and the lowest value.

Determining the highest rotational speed variation may comprise: determining a plurality of highest values of the downhole rotational speed data; determining an average highest value of the plurality of highest values of the downhole rotational speed data; determining a plurality of lowest values of the downhole rotational speed data; determining an average lowest value of the plurality of lowest values of the downhole rotational speed data; and determining a difference between the average highest value and the average lowest value.

The predetermined reference rotational speed may comprise a rotational speed rating of a top drive, a rotational speed set-point of the top drive, a constant rotational speed value, or an average of the downhole rotational speed data encompassed within the time window.

Operation of the processing device may comprise output of control commands to a driver for rotating the drill string to change parameters of the drilling operations based on the calculated downhole oscillation index.

The method may comprise: displaying the downhole oscillation index on a visual output device to be viewed by a drill rig operator; and changing parameters of the drilling operations by the drill rig operator based on the downhole oscillation index displayed on the visual output device. The method may further comprise displaying on the visual output device oscillation severity thresholds overlaying the downhole oscillation index displayed on the visual output device.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus comprising:
   a rotation sensor operable to facilitate downhole rotational speed data indicative of downhole rotational speed of at least a portion of a drill string during drilling operations;
   a visual output device; and
   a processing device comprising a processor and a memory storing computer program code,
   wherein the processing device is operable to continually:
      calculate a downhole oscillation index by:
         receiving the downhole rotational speed data;
         calculating a fundamental oscillation time period of the drill string;
         calculating a time length of a time window based on the fundamental oscillation time period; and
         processing the downhole rotational speed data encompassed within the time window; and
      output the downhole oscillation index for display on the visual output device to be viewed by a drill rig operator, wherein the drill rig operator changes parameters of the drilling operations based on the downhole oscillation index displayed on the visual output device.

2. The apparatus of claim 1 wherein processing the downhole rotational speed data comprises:
   calculating a highest rotational speed variation of the downhole rotational speed data encompassed within the time window; and
   dividing the highest rotational speed variation by a predetermined reference rotational speed.

3. The apparatus of claim 2 wherein calculating the highest rotational speed variation comprises:
   finding a plurality of highest values of the downhole rotational speed data;
   calculating an average highest value of the plurality of highest values of the downhole rotational speed data;
   finding a plurality of lowest values of the downhole rotational speed data;
   calculating an average lowest value of the plurality of lowest values of the downhole rotational speed data; and
   calculating a difference between the average highest value and the average lowest value.

4. The apparatus of claim 2 wherein the predetermined reference rotational speed comprises:
   a rotational speed rating of a top drive operable to rotate the drill string;
   a rotational speed set-point of the top drive;
   a constant rotational speed value; or
   an average of the downhole rotational speed data encompassed within the time window.

5. The apparatus of claim 1 wherein the processing device is further operable to output control commands to a driver for rotating the drill string to change parameters of the drilling operations based on the calculated downhole oscillation index.

6. The apparatus of claim 1 wherein the visual output device is operable to display oscillation severity thresholds overlaying the downhole oscillation index displayed on the visual output device.

7. A method comprising:
   receiving downhole rotational speed data indicative of downhole rotational speed of at least a portion of a drill string during drilling operations;
   calculating a fundamental oscillation time period of the drill string using a computing system;

calculating a time length of a time window based on the fundamental oscillation time period using the computing system; and calculating a downhole oscillation index based at least partially upon the downhole rotational speed data encompassed within the time window using the computing system.

8. The method of claim 7 wherein calculating the time length of the time window based on the fundamental oscillation time period comprises multiplying the fundamental oscillation time period by a safety factor.

9. The method of claim 7 wherein processing the downhole rotational speed data comprises:

calculating a highest rotational speed variation of the downhole rotational speed data encompassed within the time window; and dividing the highest rotational speed variation by a predetermined reference rotational speed.

10. The method of claim 9 wherein calculating the highest rotational speed variation comprises:

finding a highest value of the downhole rotational speed data;

finding a lowest value of the downhole rotational speed data; and calculating a difference between the highest value and the lowest value.

11. The method of claim 9 wherein calculating the highest rotational speed variation comprises:

finding a plurality of highest values of the downhole rotational speed data;

calculating an average highest value of the plurality of highest values of the downhole rotational speed data;

finding a plurality of lowest values of the downhole rotational speed data;

calculating an average lowest value of the plurality of lowest values of the downhole rotational speed data; and calculating a difference between the average highest value and the average lowest value.

12. The method of claim 9 wherein the predetermined reference rotational speed comprises:

rotational speed rating of a top drive;

rotational speed set-point of the top drive;

a constant rotational speed value; or average of the downhole rotational speed data encompassed within the time window.

13. The method of claim 7 further comprises:

displaying the downhole oscillation index on a visual output device to be viewed by a drill rig operator; and changing parameters of the drilling operations by the drill rig operator based on the downhole oscillation index displayed on the visual output device.

14. A method comprising:

receiving downhole rotational speed data indicative of downhole rotational speed of at least a portion of a drill string during drilling operations;

calculating a highest rotational speed variation among the downhole rotational speed data encompassed within a time window using a computing system; and calculating a downhole oscillation index by dividing the highest rotational speed variation by a predetermined reference rotational speed using the computing system.

15. The method of claim 14 wherein the computing system further calculates a time length of the time window.

16. The method of claim 15 wherein the computing system calculates the time length of the time window by:

calculating a fundamental oscillation time period of the drill string; and calculating a time length of a time window based on the fundamental oscillation time period.

17. The method of claim 16 wherein the computing system calculates the time length of the time window by multiplying the fundamental oscillation time period by a safety factor.

18. The method of claim 14 wherein calculating the highest rotational speed variation comprises:

finding a highest value of the downhole rotational speed data;

finding a lowest value of the downhole rotational speed data; and calculating a difference between the highest value and the lowest value.

19. The method of claim 14 wherein the predetermined reference rotational speed comprises:

rotational speed rating of a top drive;

rotational speed set-point of the top drive;

a constant rotational speed value; or average of the downhole rotational speed data encompassed within the time window.

20. The method of claim 14 further comprises:

displaying the downhole oscillation index on a visual output device to be viewed by a drill rig operator; and changing parameters of the drilling operations by the drill rig operator based on the downhole oscillation index displayed on the visual output device.

* * * * *